United States Patent [19]

Campos

[11] Patent Number: 5,062,339
[45] Date of Patent: Nov. 5, 1991

[54] SAW GUIDE APPARATUS

[76] Inventor: William Campos, 7080 Kayo Dr., Penryn, Calif. 95663

[21] Appl. No.: 636,187

[22] Filed: Dec. 31, 1990

[51] Int. Cl.⁵ .............................................. B27B 9/04
[52] U.S. Cl. ...................................... 83/763; 83/438; 83/471.3
[58] Field of Search ...................... 83/471.3, 574, 763, 83/438

[56] References Cited

U.S. PATENT DOCUMENTS

| | | | |
|---|---|---|---|
| 2,818,892 | 1/1958 | Price | 83/574 |
| 3,368,594 | 2/1968 | Drumbore | 83/574 |
| 4,378,716 | 4/1983 | Volk | 83/438 |

FOREIGN PATENT DOCUMENTS 2137929 10/1984 United Kingdom ............... 83/471.3

*Primary Examiner*—Mark Rosenbaum
*Assistant Examiner*—John M. Husar
*Attorney, Agent, or Firm*—Leon Gilden

[57] ABSTRACT

A saw guide apparatus includes a planar support base mounting a first and second track member thereon. Each track member includes an L-shaped leg mounted at a rearward end thereof to a mounting block that is coextensive with the support base rear edge. Each track member includes a respective first and second L-shaped guide to define a respective U-shaped track between the guide and a horizontal leg of each track member to receive and capture a saw guide plate of an associated saw therewithin. The horizontal legs extend forwardly a distance substantially equal to a predetermined length between a forward and rear edge of the support base and are pivotally mounted within arcuate slots directed through the base and are selectively locked in position to accommodate a particular orientation of the track members. The horizontal legs extend forwardly to a vertical leg and thereby define an inclosed gap between the support base wherein a work piece to be cut is directed through the gap defined by each first and second track member.

1 Claim, 6 Drawing Sheets

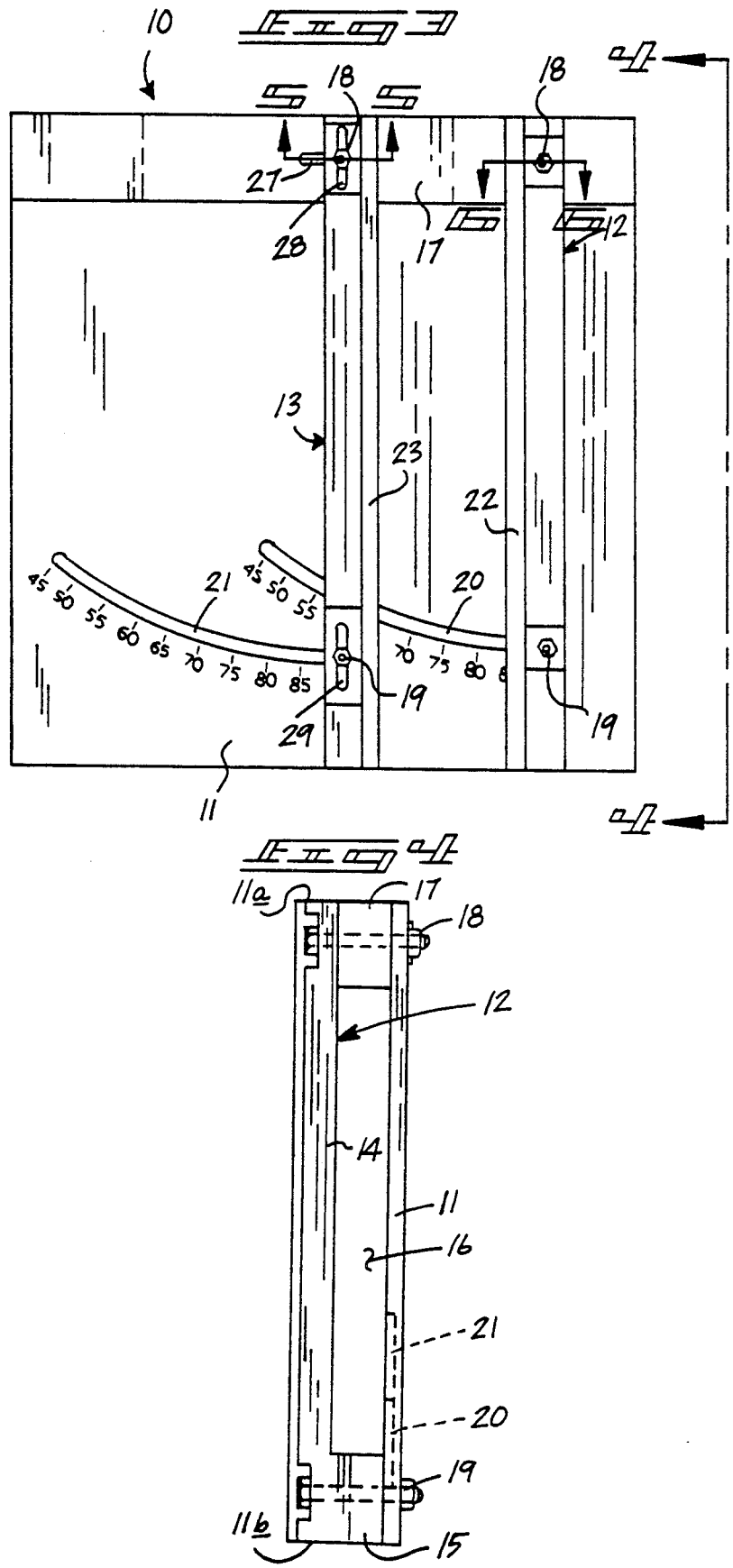

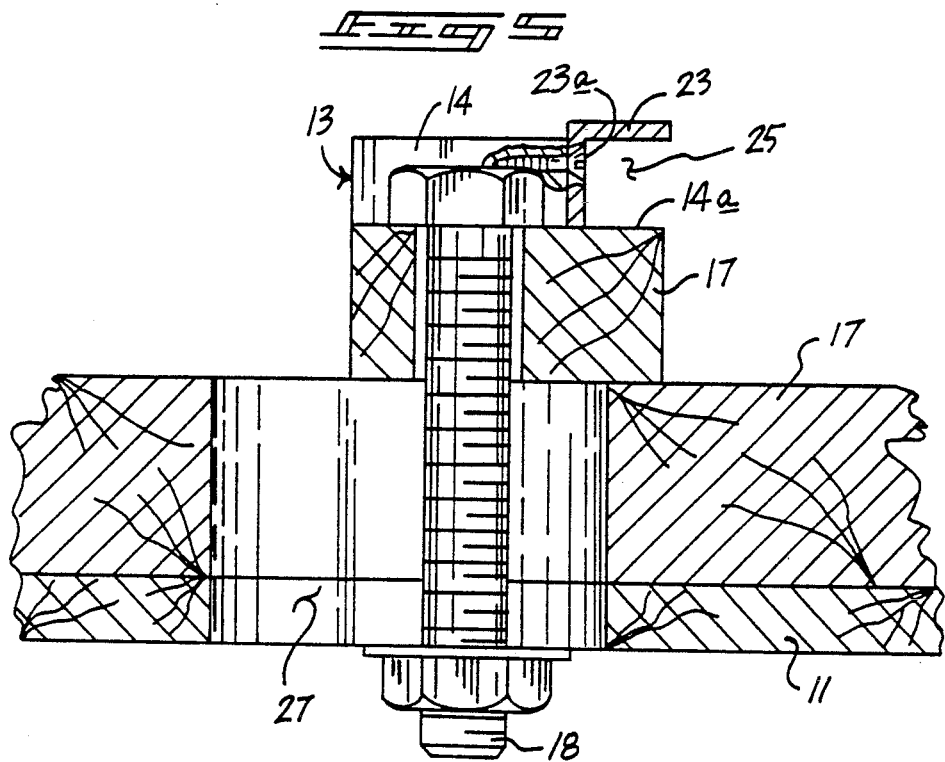
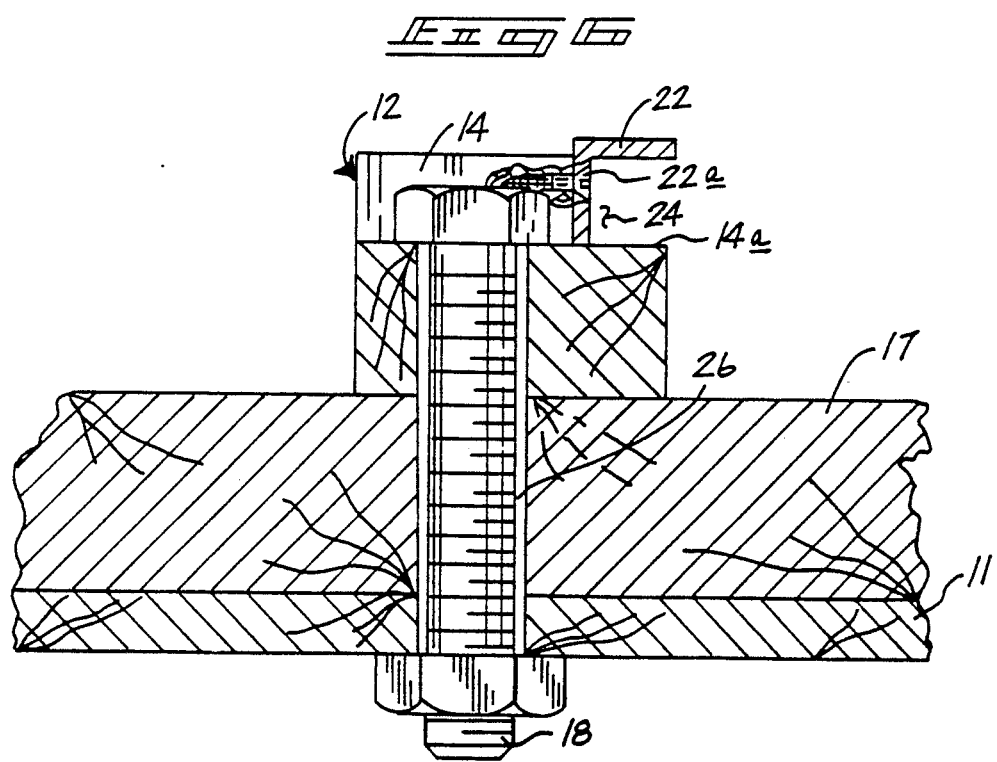

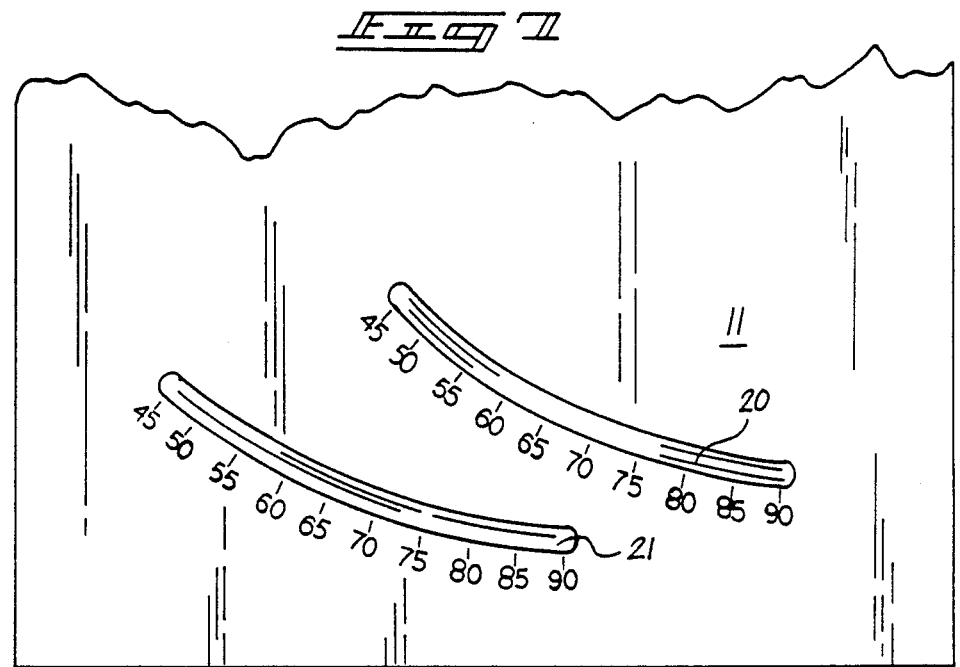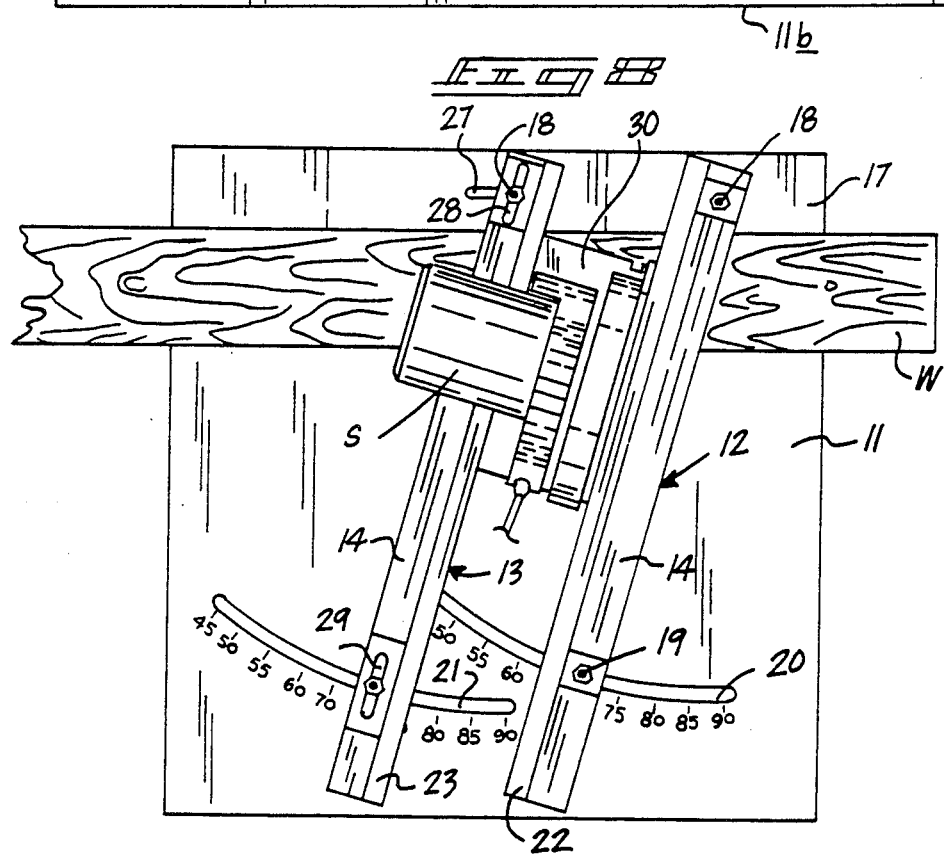

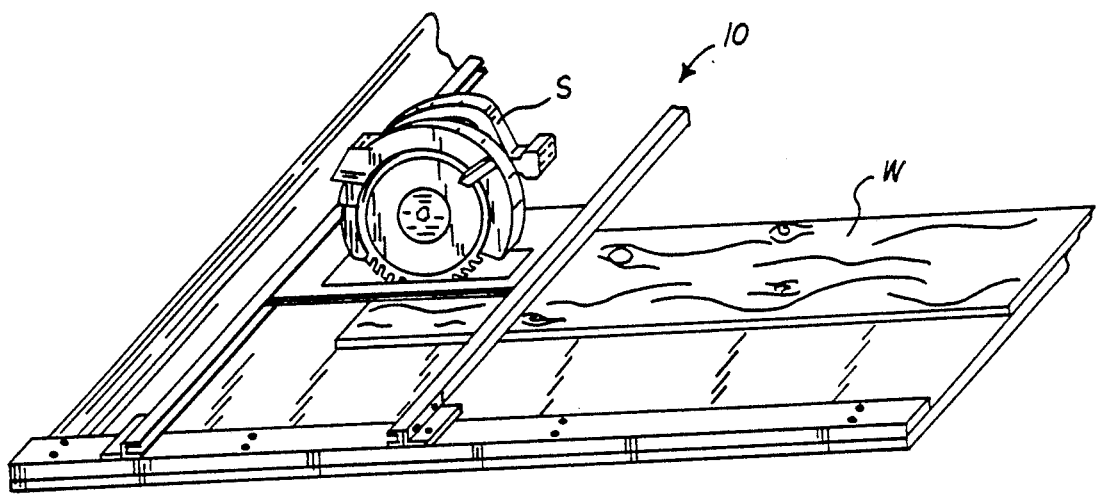

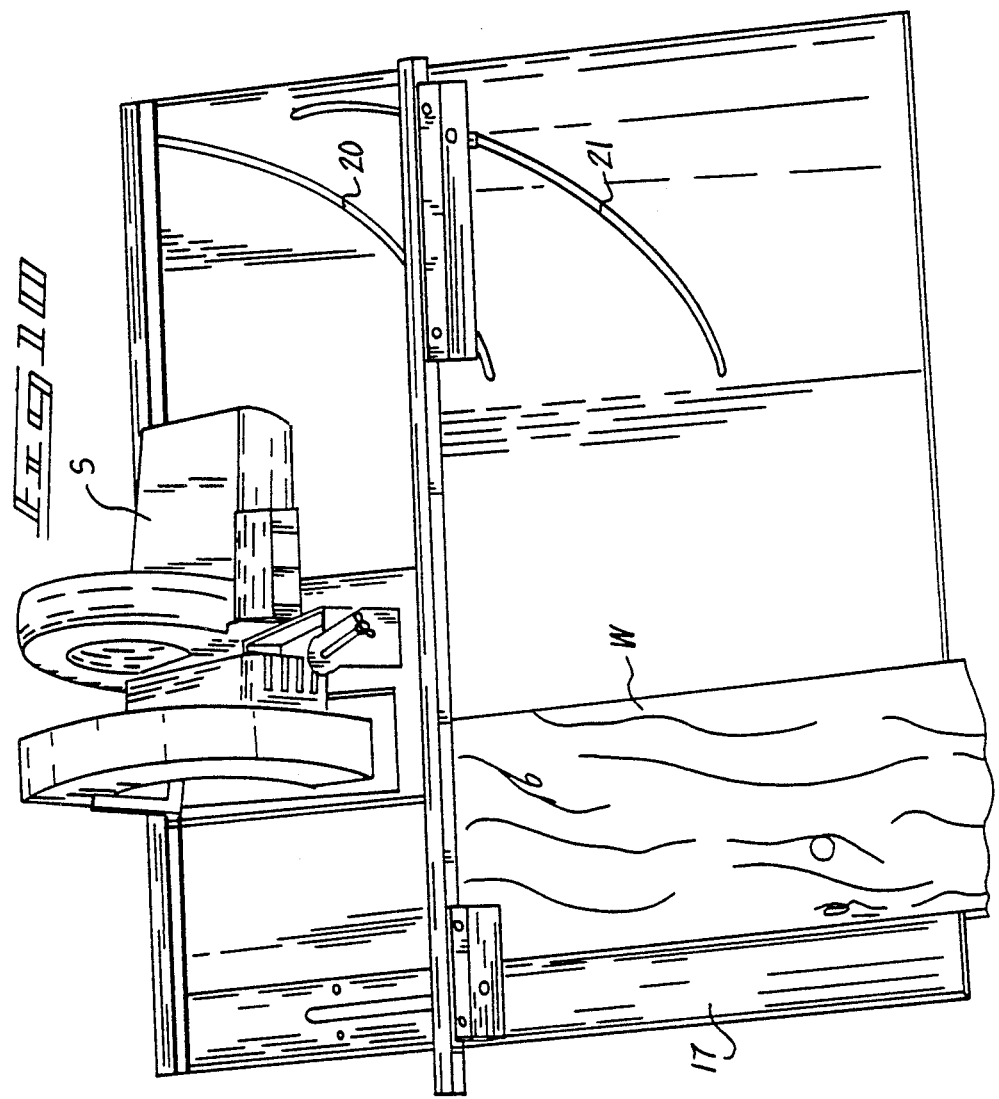

SAW GUIDE APPARATUS

BACKGROUND OF THE INVENTION

1. Field of the invention

The field of the invention relates to saw guide apparatus, and more particularly pertains to a new and improved saw guide apparatus wherein the same is provided with angular rotation of a plurality of track members to provide securement and capture of a portable saw within opposed tracks.

2. Description of the Prior Art

The use of various saw guide apparatus is well known in the prior art. Further, it is frequently desirable to utilize a conventional portable power saw in a fixed arrangement to provide precise cutting of work pieces. Prior art devices have been utilized but have frequently failed to accommodate and capture a saw guide plate of an associated saw guide to prevent an associated saw from "jumping" or displacing the saw relative to the guide structure. Examples of the prior art include U.S. Pat. No. 4,320,678 to VOLK wherein a plurality of tracks are laterally displaceable relative to an underlying table wherein the track structure of the VOLK patent is conventional as set forth in the prior art wherein a saw plate of an associated saw is capable of displacing a saw relative to the guide rail apparatus during use.

U.S. Pat. No. 3,130,758 to MCKINLEY sets forth a further prior art apparatus providing for a plurality of rectangular tracks to position a portable saw thereon wherein again the tracks are open at their upper ends to permit a saw to displace itself relative thereto.

U.S. Pat. No. 4,378,716 to VOLK sets forth a further example of a prior art track structure supporting a saw thereon.

U.S. Pat. No. 4,751,865 to BUCHALEW provides a saw guide apparatus wherein the same utilizes a guide assembly positionable over an associated work piece wherein the guide assembly clamps a saw plate thereto wherein the thusly clamped saw plate is slidable relative to a lateral track to permit severing of an associated work piece.

U.S. Pat. No. 4,350,066 to VOLK is a further example of a track accommodating saw arrangement to slidingly receive a saw thereon.

As such, it may be appreciated that there continues to be a need for a new and improved saw guide apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of saw guide apparatus present in the prior art, the present invention provides a new and improved saw guide apparatus wherein the same provides securement for a portable saw assembly within laterally adjustable and pivotally positionable guide members to provide desired orientation of the saw overlying an associated work piece. As such, the general purpose of the present invention, which will be described subsequently in greater detail, is to provide a new and improved saw guide apparatus which has all the advantages of the prior art saw guide apparatus and none of the disadvantages.

To attain this, the saw guide apparatus of the invention includes a saw guide apparatus includes a planar support base mounting a first and second track member thereon. Each track member includes an L-shaped leg mounted at a rearward end thereof to a mounting block that is coextensive with the support base rear edge. Each track member includes a respective first and second L-shaped guide to define a respective U-shaped track between the guide and a horizontal leg of each track member to receive and capture a saw guide plate of an associated saw therewithin. The horizontal legs extend forwardly a distance substantially equal to a predetermined length between a forward and rear edge of the support base and are pivotally mounted within arcuate slots directed through the base and are selectively locked in position to accommodate a particular orientation of the track members. The horizontal legs extend forwardly to a vertical leg and thereby define an inclosed gap between the support base wherein a work piece to be cut is directed through the gap defined by each first and second track member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved saw guide apparatus which has all the advantages of the prior art saw guide apparatus and none of the disadvantages.

It is another object of the present invention to provide a new and improved saw guide apparatus which may be easily and efficiently manufactured and marketed.

It is a further object of the present invention to provide a new and improved saw guide apparatus which is of a durable and reliable construction.

An even further object of the present invention is to provide a new and improved saw guide apparatus which is susceptible of a low cost of manufacture with regard to both materials and labor, and which accordingly is then susceptible of low prices of sale to the consuming public, thereby making such saw guide apparatus economically available to the buying public.

Still yet another object of the present invention is to provide a new and improved saw guide apparatus which provides in the apparatuses and methods of the prior art some of the advantages thereof, while simultaneously overcoming some of the disadvantages normally associated therewith.

Still another object of the present invention is to provide a new and improved saw guide apparatus which may be compactly stored when not being utilized.

Yet another object of the present invention is to provide a new and improved saw guide apparatus wherein the same securably and slidably receives a portable saw in a secure overlying relationship relative to a work piece.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the instant invention.

FIG. 4 is an orthographic side view taken along the lines 4—4 of FIG. 3 as indicated by the arrows.

FIG. 5 is an orthographic view taken along the lines 5—5 of FIG. 3 in the direction indicated by the arrows.

FIG. 6 is an orthographic view taken along the lines 6—6 of FIG. 3 in the direction indicated by the arrows.

FIG. 7 is an orthographic top view illustrating the first and second guide slots mounted within the support base of the instant invention.

FIG. 8 is an orthographic top view of the instant invention in an operative configuration mounting a work Piece therewithin.

FIG. 9 is an isometric illustration the invention in a ripping procedure of a workpiece.

FIG. 10 is an isometric illustration of a further ripping procedure of the use of the instant invention utilizing a mounting block as a guide.

DESCRIPTION OF THE PREFERRED EMBODIMENT

Figure 1:
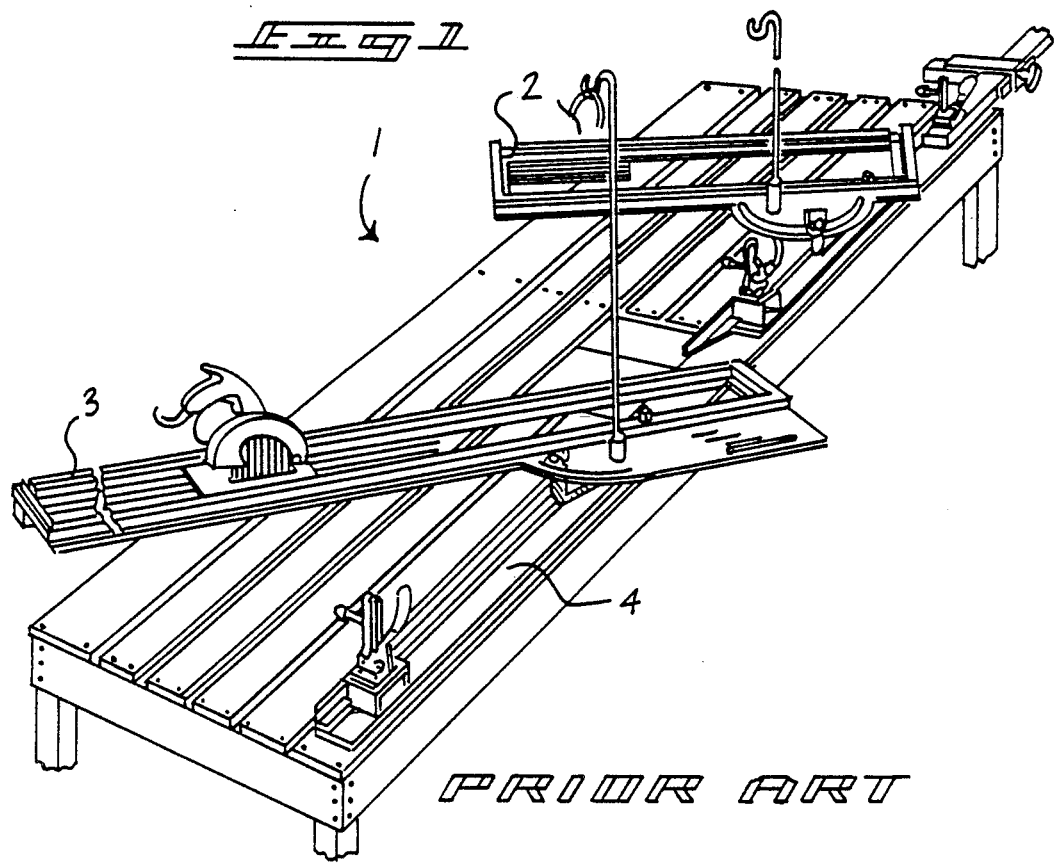
FIG. 1 is an isometric illustration of a prior art saw guide apparatus.

With reference now to the drawings, and in particular to FIGS. 1 to 8 thereof, a new and improved saw guide apparatus embodying the principles and concepts of the present invention and generally designated by the reference numeral 10 will be described.

Figure 2:
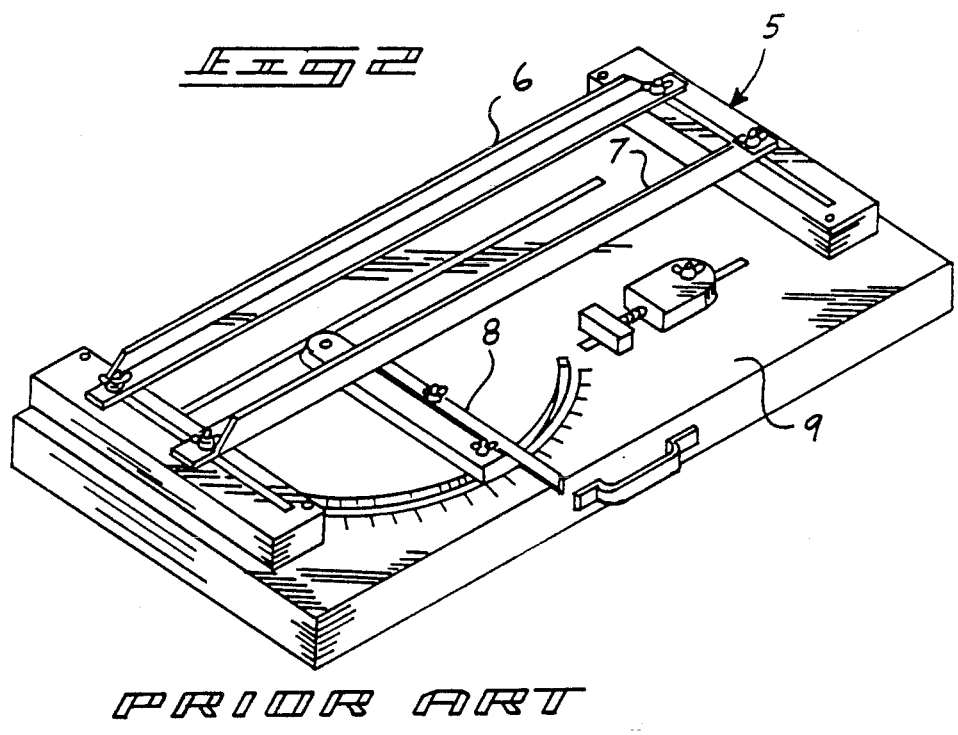
FIG. 2 is an isometric illustration of a further prior art saw guide apparatus.

FIG. 1 is an isometric illustration of a prior art saw guide apparatus 1 wherein the saw guide apparatus includes a support base 4 mounting a first and second rectangular guide arrangement 2 and 3 respectively to receive a portable saw within the track structure. The track structure as noted provides unconfined vertical positioning of the saw to permit displacement of the saw relative to the track structure during a sawing procedure. FIG. 2 is a further prior art saw guide apparatus 5 wherein a first and second L-shaped track 6 and 7 receive a saw thereon wherein the L-shaped tracks are confined in a vertical orientation in a manner as set forth in the prior art construction of FIG. A guide member 8 is pivotal relative to the base 9 to position a work piece relative to the guide structure.

More specifically, the saw guide apparatus 10 of the instant invention essentially comprises a rectangular planar support base 11 defined by a rear edge 11a spaced from and parallel to a forward edge 11b. A first track member 12 and a second spaced track member 13 are arranged for parallel pivotment overlying the base 11 to accommodate a portable saw thereon in a manner as exemplified in FIG. 8 for example. Each track member 12 and 13 are defined by a equal predetermined length including a horizontal leg 14 equal to the predetermined length wherein a forward vertical leg 15 defined by a predetermined height. The horizontal leg 14 of each track member 12 and 13 is pivotally mounted at its rear end by use of a cylindrical rear pivot fastener boss 18 directed through and received within a recess through an upper surface of each horizontal leg 14 to pivotally mount the rear terminal end of each horizontal leg 14 relative to the rear edge 11a of the base 11 and overly a mounting block 17. The mounting block 17 is equal to the predetermined height defined by the forward vertical leg 15 to define an enclosed gap 16 (see FIG. 4) to receive a work piece W therethrough in a manner as illustrated in FIG. 8. The mounting block 17 is coextensive with the rear edge of the base 11 defined a guide surface between a forward surface of the mounting block 17 and a rear surface of the forward vertical leg 15 of each track member 12 and 13. The forward end of each track member 12 and 13 is pivotally mounted through the base 11 utilizing a forward pivot fastener boss 19 directed through the forward end of the horizontal leg orthogonally therethrough and parallel to the rear pivot fastener boss 18. Each forward fastener boss 19 is longitudinally aligned through each forward vertical leg 15 and directed through a respective first and second arcuate guide slot 20 and 21 associated with each respective first and second track member 12 and 13 in a manner as illustrated in FIG. 3 and 8 for example. The rear pivot fastener boss of the first track member 12 is directed through an associated rear pivot bore 26 as illustrated in FIG. 6 while the rear pivot fastener boss 18 of the second track member 13 is laterally displaceable relative to the first track member 12 within a rear pivot slot 27 longitudinally aligned with the mounting block 17. A rear horizontal leg slot 28 adjustably and longitudinally adjust the second track member 12 relative to the second arcuate guide slot 21 wherein a forward horizontal leg slot 29 longitudinally aligned with the rear horizontal leg slot 28 permits longitudinal adjustment of the horizontal leg 14 of the second track member 13 to provide accommodation and pivotment of the second track 13 within the second arcuate guide slot 21 upon displacement of the second track member 13 relative to the rear pivot slot 27.

Each horizontal leg 14 of each track member 12 and 13 respectively includes an associated first and second L-shaped guide 22 and 23. Each guide 22 and 23 is mounted to the horizontal leg 14 in a confronting relationship to define a respective first and second U-shaped track 24 and 25 within the respective first and second track members 23 and 13. The first and second U-shaped track 24 and 25 slidably and vertically retains a saw guide plate 23 within the spaced U-shaped tracks 24 and 25 in a manner as illustrated in FIG. 8. The U-shaped tracks 24 and 25 are open at each end thereof to permit sliding reception and removal of the associated saw S relative to the U-shaped tracks. The second track member 13 is laterally adjustable relative to the first track member 12 by use of the rear pivot slot 27 to accommodate various widths of saw guide plates 30 of associated saw members S. Replacement of the L-shaped guides 22 and 23 is accommodated by use of the removable first and second fasteners 22a and 23 respectively utilized to secure the L-shaped tracks overlying a ledge surface 14a of each horizontal leg 14.

FIGS. 9 and 10 illustrate the use of the saw member S orthogonally oriented between the orthogonal legs 14 to permit a "ripping" of a workpiece W as illustrated, wherein the saw blade is directed longitudinally of the defined wood grain of an associated workpiece W utilizing a mounting block 17 as a guide, as illustrated in FIG. 10.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A saw guide apparatus comprising:
   a planar support base, the support base including an elongate rear edge spaced from and parallel a forward edge, and
   the rear edge and forward edge spaced apart a predetermined length, and
   a first track member and a second track member mounted overlying the support base, and
   each respective first and second track member including a respective first and second horizontal leg fixedly and orthogonally mounted to a respective first and second vertical leg, the first horizontal leg pivotally mounted to the support base adjacent the rear edge, and the second horizontal leg pivotally mounted to the support base adjacent the rear edge independent of the first horizontal leg, and
   the respective first and second vertical legs pivotally mounted independent of one another overlying the base adjacent the forward edge of the base, and
   including a mounting block fixedly mounted overlying the support base coextensive with the rear edge and including a planar forward surface orthogonally oriented relative to the planar base, and
   the support block defined by a predetermined height, and
   each vertical leg of each first and second track member defined by a height equal to the predetermined height wherein the first and second track member each define an enclosed gap to receive a work piece therethrough wherein the enclosed gap is defined by the base, the horizontal leg of each respective first and second track member, and a forward vertical leg of each respective first and second track member, and
   wherein each horizontal leg of each respective first and second track member includes a respective first and second "L" shaped guide mounted thereon, each "L" shaped guide including a horizontal "J" shaped guide leg overlying each respective horizontal leg of each respective first and second track member to define a respective first and second "U" shaped track of each first and second track member wherein each first and second "U" shaped track are in a confronting parallel relationship to receive a saw guide plate of an associated saw therebetween, and
   wherein the second horizontal leg of the second track member includes a rear pivot boss and the rear pivot boss of the second track member is slidably adjustable within a rear pivot slot longitudinally aligned through the mounting block and the support base, and the horizontal leg of the second track member including a rear horizontal leg slot orthogonally oriented and bisecting the rear pivot slot to receive the rear pivot fastener boss therethrough, and wherein the horizontal leg of the second track member further includes a forward horizontal leg slot longitudinally aligned with the rear horizontal leg slot to longitudinally adjust the second track member relative to the support base, and
   wherein the forward horizontal slot of the second track member includes a forward pivot fastener boss directed therethrough wherein the forward pivot boss is further directed orthogonally through the planar support base and is slidably adjustably mounted within a second arcuate guide slot, and further including a first arcuate guide slot to receive a forward pivot fastener boss directed through the horizontal leg of the first track member to permit parallel pivotment of the first track member relative to the second track member, and
   wherein the horizontal leg of the first track member includes a rear pivot fastener boss orthogonally directed through the horizontal leg, the mounting block, and the base, and each rear and forward pivot fastener boss of each horizontal leg of the respective first and second track members are arranged parallel relative to one another.

* * * * *